US012679381B2

(12) United States Patent
Esparza Garcia et al.

(10) Patent No.: US 12,679,381 B2
(45) Date of Patent: Jul. 14, 2026

(54) METHOD AND CONTROL UNIT

(71) Applicant: Robert Bosch GmbH, Stuttgart (DE)

(72) Inventors: Jose Domingo Esparza Garcia,
Stuttgart (DE); Max Neuner,
Boeblingen (DE); Peter Golya,
Budapest (HU)

(73) Assignee: ROBERT BOSCH GMBH, Stuttgart
(DE)

( * ) Notice: Subject to any disclaimer, the term of this
patent is extended or adjusted under 35
U.S.C. 154(b) by 553 days.

(21) Appl. No.: 17/885,124

(22) Filed: Aug. 10, 2022

(65) Prior Publication Data

US 2023/0071439 A1    Mar. 9, 2023

(30) Foreign Application Priority Data

Sep. 9, 2021    (DE) ..................... 10 2021 209 977.7

(51) Int. Cl.
B60W 40/04        (2006.01)
B60W 60/00        (2020.01)
G06V 20/58        (2022.01)

(52) U.S. Cl.
CPC .......... B60W 40/04 (2013.01); B60W 60/001
(2020.02); G06V 20/584 (2022.01); *B60W*
*2420/403* (2013.01); *B60W 2554/4046*
(2020.02); *B60W 2555/60* (2020.02); *B60W*
*2556/20* (2020.02)

(58) Field of Classification Search
CPC .............. B60W 40/04; B60W 60/001; B60W
2556/20; B60W 2555/60; B60W
2554/4046; B60W 2420/403; G06V
20/584
See application file for complete search history.

(56) References Cited

U.S. PATENT DOCUMENTS

| | | | | |
|---|---|---|---|---|
| 9,470,540 | B1 * | 10/2016 | Castellucci | ........ G01C 21/3685 |
| 2019/0180617 | A1 * | 6/2019 | Hori | ................. B60W 50/0097 |
| 2021/0221370 | A1 * | 7/2021 | Lanfranco | ............ G06V 20/584 |
| 2022/0204032 | A1 * | 6/2022 | Margines | .......... B60W 60/0015 |
| 2022/0402492 | A1 * | 12/2022 | Sakakura | ............. G06V 20/584 |

FOREIGN PATENT DOCUMENTS

| | | |
|---|---|---|
| DE | 102017206847 A1 | 10/2018 |
| DE | 102020211017 B3 | 9/2021 |

* cited by examiner

*Primary Examiner* — Hussein Elchanti
(74) *Attorney, Agent, or Firm* — NORTON ROSE
FULBRIGHT US LLP

(57) ABSTRACT

A method for ascertaining which one of at least two traffic
light systems located in the area in front of a motor vehicle
is to be observed by this motor vehicle. The ascertainment
is performed by evaluating the driving behavior of a vehicle
traveling in front as a function of the current light status of
the traffic light systems.

11 Claims, 2 Drawing Sheets

METHOD AND CONTROL UNIT

CROSS REFERENCE

The present application claims the benefit under 35 U.S.C. 119 of German Patent Application No. DE 10 2021 209 977.7 filed on Sep. 9, 2021, which is expressly incorporated herein by reference in its entirety.

FIELD

The present invention relates to a method for ascertaining which one of at least two traffic light systems located in the area in front of a motor vehicle has to be observed by this vehicle. In addition, the present invention also relates to a control unit for a motor vehicle, which is set up/programmed to carry out this method. The present invention also relates to a motor vehicle equipped with such a control unit.

BACKGROUND INFORMATION

In the context of driver assistance systems for motor vehicle, it conventional to analyze the movement of a vehicle traveling in front so that the motor vehicle can be accelerated and decelerated in such a way that it follows the vehicle traveling in front. In the context of autonomous driving, it is also conventional to detect and analyze the display status of light signaling systems for controlling traffic, known to the expert also as traffic light systems, and to take it into account in the control of the vehicle. However, this often turns out to be problematic when the road on which the motor vehicle is traveling has two or more traffic lanes and a separate traffic light system is provided for each traffic lane. A correct allocation of the individual traffic light systems to the respective traffic lane by the driver assistance system is difficult and often incorrect in such a case.

SUMMARY

It is an object of the present invention to provide an improved embodiment of a method which may be used to ascertain which one of at least two traffic light systems must be observed with regard to the displayed light signals by a motor vehicle in whose area in front the traffic light systems are situated.

This object may be achieved by the subject matter of the present invention. Preferred embodiments of the present invention are disclosed herein.

A feature of the present invention is to utilize the driving behavior of a motor vehicle traveling in front for ascertaining which one of at least two traffic light systems located in the area in front of a motor vehicle must be observed by the motor vehicle. This makes it possible to exploit the fact that the vehicle traveling in front in the same traffic lane will usually observe the same traffic light system as the motor vehicle itself. By comparing the behavior of the vehicle driving in front with the light status of the existing light signal system, it may therefore be estimated, correctly and with a high probability, which one of the traffic light systems located in front must also be observed by the (trailing) motor vehicle. For example, based on a scenario in which two of three traffic light systems display a red light but the remaining third traffic light system shows a green light and the preceding vehicle accelerates, it may be inferred that the traffic light system signaling a green light is allocated to the vehicle driving in front and thus also to the trailing motor vehicle, so that its light signals must be observed by both vehicles.

The method according to the present invention is used for ascertaining which one of at least two traffic light systems located in the area in front of a motor vehicle has to be observed by this motor vehicle. In the method according to the present invention, this ascertainment is performed by evaluating the driving behavior of a vehicle traveling in front as a function of the current light status of the traffic light systems.

According to a preferred example embodiment of the present invention, a trust value is allocated to at least one of the traffic light systems, preferably each traffic light system, as a function of the light status of the traffic light system and the driving behavior of the vehicle driving in front, and it is derived from the trust values which one of the traffic light systems is to be observed. Thus, the driving behavior of the preceding vehicle is used to ascertain the traffic light system to be observed.

According to one preferred example embodiment of the present invention, the method encompasses four measures a) through d). According to a first measure a), one of the at least two traffic light systems is selected, and a trust value is specified for the selected traffic light system. Different approaches may be used for selecting the traffic light system. Possible, for example, is a selection of the traffic light system based on the positions of the traffic light systems, especially relative to the lane boundaries of the currently traveled traffic lane. Moreover, the relative positions of the individual traffic light systems with respect to one another may also be taken into consideration.

In a second measure b), the driving behavior of a motor vehicle driving directly in front is monitored as a function of the display status of the selected traffic light system. In a third measure c), it is determined whether the trust value is to be increased or reduced as a function of the monitoring that has taken place in measure b). If the evaluation shows that the trust value is to be reduced, then measures a) through c) of the method are carried out anew in the selection of another traffic light system until a traffic light system has been found for which the evaluation according to measure c) shows that the trust value is to be increased or until the measures a) through c) have been carried out anew for all traffic light systems without a traffic light system having been found for which the trust value is to be increased.

If a traffic light system for which the trust value is to be increased was able to be ascertained in measure c), then the increased trust value is compared with a predefined threshold value in a further measure d) and the display status of the selected traffic light system is output precisely when the trust value is greater than the predefined threshold value.

According to one preferred example embodiment of the present invention, the measure b) is carried out only if the distance between the motor vehicle and the traffic light system does not exceed a predefined maximum value. This ensures that the distance between the vehicle traveling in front and the traffic light system is likewise less than the predefined maximum value. This takes the fact into account that a vehicle observes traffic light systems located in the area in front only if the traffic light system is also located in the vicinity of this vehicle.

According to one advantageous further development of the present invention, after the measure c) has been executed during the first cycle of the method, a transition to measure d) takes place if the evaluation of measure c) during the first cycle shows that the trust value is to be increased. If the trust value of the traffic light system already selected during the first cycle is increased, then this should be taken as an indication that this traffic light system is to be observed both by the vehicle traveling in front and the motor vehicle in which the method according to the present invention is carried out.

In an especially preferred manner, a transition to measure d) may be undertaken for the traffic light system selected during the first cycle if the evaluation of this traffic light system according to measure c) reveals that the trust value is to be reduced and no further traffic light system was ascertainable for which the trust value is to be increased.

According to another preferred embodiment of the present invention, it is evaluated in measure c) that the trust value is to be increased if a red display status of the traffic light system was detected and a deceleration above a predefined threshold value of the vehicle traveling in front was detected. In the same way, it is evaluated in measure c) of this embodiment that the trust value is to be increased if a green display status of the traffic light system was detected and no significant change in the speed or a speed above a predefined threshold value of the vehicle traveling in front was detected. In both previously described cases, the driving behavior of the preceding vehicle agrees with the display status of the selected traffic light system. This indicates that the selected traffic light system is allocated to the vehicle traveling in front and is therefore observed by this vehicle.

According to a further preferred embodiment of the present invention, it is evaluated in measure c) that the trust value is to be reduced if a green display status of the traffic light system was detected and a deceleration above a pre-defined threshold value was detected. In the same way, it is evaluated in measure c) of this embodiment that the trust value is to be reduced if a green display status of the of the traffic light system was detected and no significant change in the speed of the vehicle traveling in front or a speed above a predefined threshold value of the vehicle traveling in front was detected. In both of the afore-described cases, the driving behavior of the vehicle traveling in front does not agree with the display status of the selected traffic light system. This indicates that the selected traffic light system is not allocated to the vehicle traveling in front and is therefore also not observed by that vehicle.

In addition, the present invention relates to a control unit, which is set up/programmed to carry out the afore-described method according to the present invention. The advantages of the afore-described method thus transfer to the motor vehicle according to the present invention.

Moreover, the present invention relates to a motor vehicle having an optical sensor for monitoring an area in front of the motor vehicle. The motor vehicle includes a control unit according to the present invention as described in the previous text, which is connected in a data-transmitting manner to the optical sensor. As a result, sensor data pertaining to the area in front of the vehicle are transmittable to the control unit. In addition, the advantages of the afore-described method also apply to the motor vehicle according to the present invention.

Further important features and advantages of the present invention result from the figures and the associated description of the figures based on the figures.

It is understood that the previously mentioned features and the features still to be described in the following text may not only be used in the indicated combination but also in other combinations or on their own without departing from the framework of the present invention.

Preferred exemplary embodiments of the present invention are shown in the figures and will be described in greater detail in the following description where identical reference numerals relate to identical or similar or functionally equivalent components.

DETAILED DESCRIPTION OF EXAMPLE EMBODIMENTS

Figure 1:
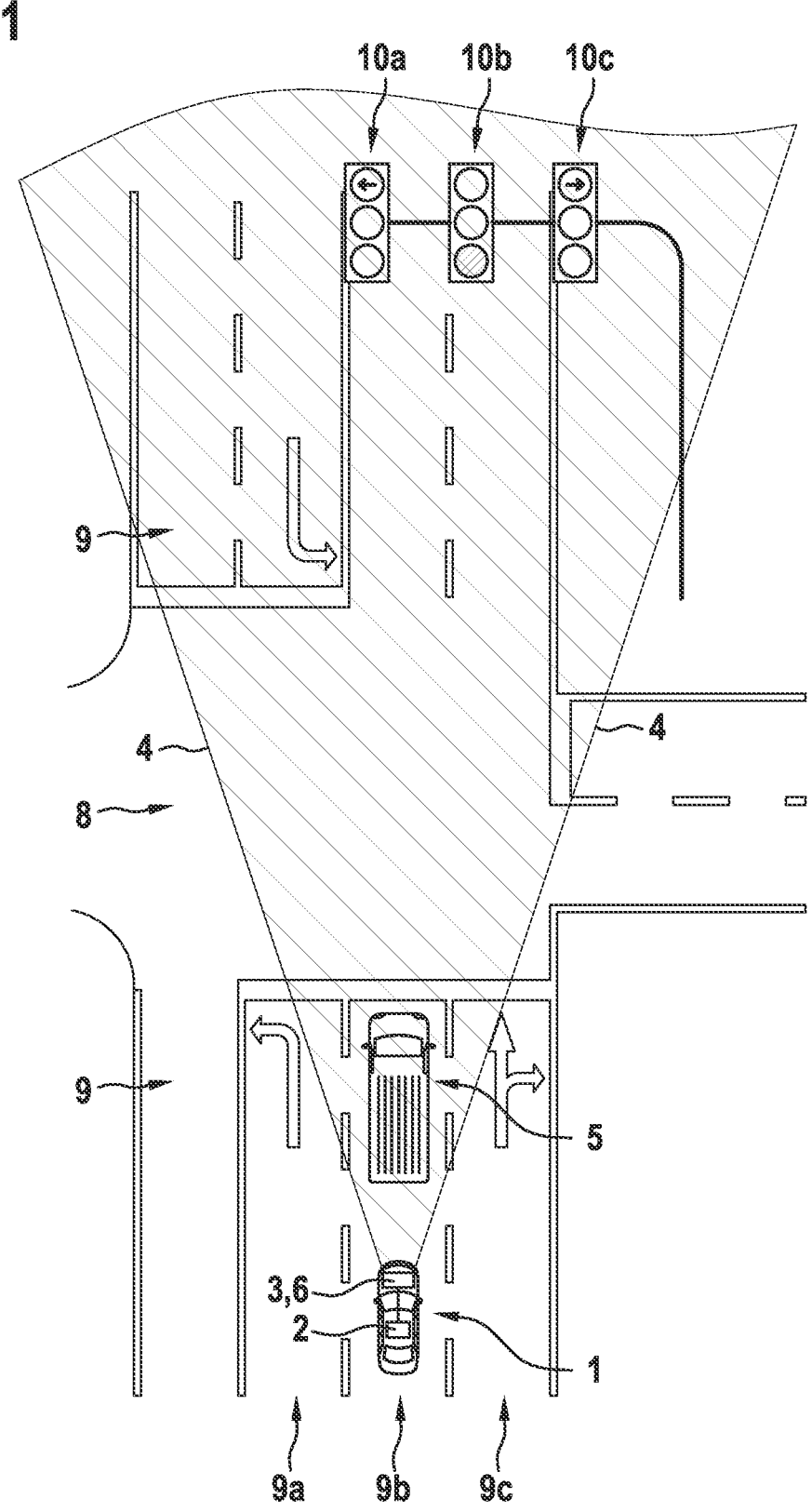
FIG. 1 shows a traffic scenario in which the method according to the present invention is used.

FIG. 1 illustrates in a schematic representation and in a top view a traffic scenario in which the method according to the present invention is used. FIG. 1 shows a road 9 in the region of an intersection 8. Three traffic light systems 10a, 10b, 10c assume the traffic control in the vicinity of intersection 8. Traffic light system 10a is allocated to a traffic lane 9a for cars making a left turn. Traffic light system 10b is situated in a traffic lane 9b selected by vehicles intent on driving across intersection 8. Traffic light system 10c is allocated to a traffic lane 9c for cars making a right turn. All three traffic light systems 10a-10c are able to be switched between a red display status in which respective traffic light system 10a-10c generates a red light signal, and a green display status in which respective traffic light system 10a-10c generates a green light signal.

Traveling on road 9 is a motor vehicle 1 according to the present invention and a further motor vehicle 5, which travels in front of this motor vehicle 1. Motor vehicle 1 according to the present invention is equipped with a control unit 2, shown only as a rough outline in FIG. 1, which is set up and programmed to carry out the method according to the present invention. In addition, motor vehicle 1 includes an optical sensor 3, i.e., a camera 6 which generates image sequences in the exemplary scenario, by which the area 4 in front of motor vehicle 1 is able to be monitored. Optical sensor 3 or camera 6 is connected to control unit 2 in a data-transmitting manner. As a result, image sequences of area 4 in front generated by camera 6 are transmittable to control unit 2 and evaluated there.

In the example of FIG. 1, the images of such an image sequence include vehicle 5 located in the area 4 in front and the three traffic light systems 10a, 10b and 10c likewise located in area 4 in front.

In the exemplary scenario of FIG. 1, both motor vehicle 1 according to the present invention and vehicle 5 traveling in front are located in traffic lane 9b so that both motor vehicle 1 and the preceding vehicle 5 have to observe the light signals of traffic light system 10b. Traffic light systems 10a and 10c, on the other hand, are irrelevant. In the exemplary scenario of FIG. 1, traffic light systems 10a and 10c exhibit a red display status. In addition, FIG. 1 shows traffic light system 10b after its status has just changed from the red to the green display status. Thus, traffic light system 10b features the green display status. For that reason, vehicle 5, which was stopped earlier on account of the red display status of traffic light system 10b, increases its speed and exceeds a predefined speed threshold value.

In the following text, the flow diagram of FIG. 2 will be used to describe how it is possible to use the method according to the present invention for ascertaining that traffic light system 10b is allocated to center lane 9b in which motor vehicle 1 is traveling, so that its light signals must be observed not only by vehicle 5 traveling in front but also by motor vehicle 1.

This ascertainment is performed by evaluating the driving behavior of vehicle 5 traveling in front as a function of the current display status of traffic light systems 10*a*, 10*b*, 10*c*. In the process, a trust value V is allocated to traffic light systems 10*a*-10*c* as a function of their displayed status and the driving behavior of vehicle 5 traveling in front. Based on trust values V, it is derived which one of traffic light systems 10*a*-10*c* is allocated to motor vehicle 1 so that motor vehicle 1 is obligated to observe its light signals.

The method according to the present invention encompasses the four measures a) to d) described in the following text. According to measure a), one of traffic light systems 10*a*-10*c* is selected from the three traffic light systems 10*a*, 10*b*, 10*c* shown in FIG. 1. In the exemplary scenario, first traffic light system 10*a*, which is allocated to traffic lane 9*a*, is selected at the outset. A (starting) trust value V is specified for this traffic light system 10*a*.

In measure b), the driving behavior of vehicle 5 traveling in front is monitored with the aid of optical sensor 3. Prior to executing measure b), it may be checked in a measure b0) whether a distance x of the distance between motor vehicle 1 and traffic light system 10*a* does not exceed a predefined maximum value $x_{max}$. In such a case, measure b) is carried out only if this is true. The measure is aborted in the other case.

Figure 2:
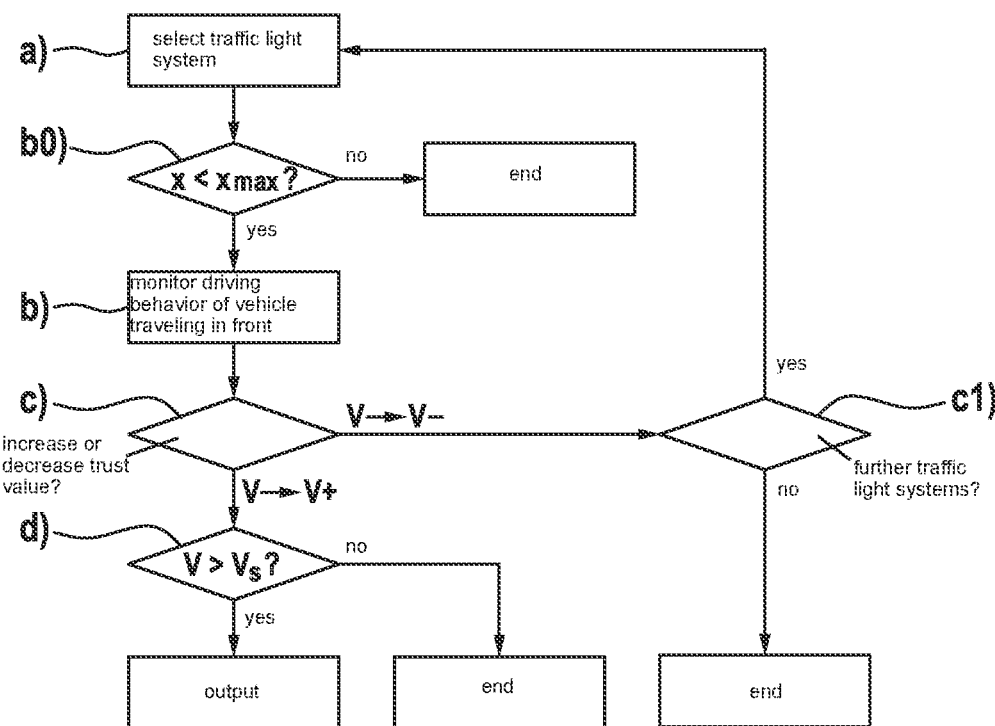
FIG. 2 shows a flow diagram illustrating the method according to the present invention by way of example.

In the example of FIG. 2, it is detected in measure b) that vehicle 5 is accelerating as previously described, which means that its speed increases and also exceeds a predefined speed threshold value as a result of the continuing acceleration.

In a measure c) following measure b), it is evaluated whether trust value V is to be increased or reduced as a function of the monitoring according to measure b). The red display status of first traffic light system 10*a* is detected in the example. In the same way, the previously described speed increase of vehicle 5 traveling in front is detected. However, this driving behavior is inconsistent with the red display status of first traffic light system 10*a*. As a result, as shown in FIG. 2, trust value V is reduced to a trust value V−.

In a further measure c1), it is then checked whether optical sensor 4 has detected still further, not yet selected traffic light systems. In the exemplary scenario, these are the two traffic light systems 10*b* and 10*c*. As a result, traffic light system 10*b* will be selected thereafter, and measures a) through c) are cycled through anew for this traffic light system 10*b*. If no additional not yet selected traffic light system had been able to be identified in measure c1), then the method would have been terminated at this point.

During the renewed, i.e., second, cycling through measures a) through c) including measure b0), the green display status of traffic light system 10*b* is detected in measure c). In addition, as already described based on the first cycling through measures a) through c), it is detected from the recorded video image sequence that vehicle 5 traveling in front is moving at a speed that lies above a predefined threshold value. During the second cycle, it is therefore determined that trust value V is to be increased to V+.

In a further measure d) of the method according to the present invention, increased trust value V is compared with a predefined threshold value $V_s$. In this particular example, trust value V is greater than threshold value $V_s$. The green display status is therefore emitted as output. If trust value V were equal to or lower than threshold value $V_s$, then the present method would be terminated without such an output.

During the first cycle of the present method, a direct transition to measure e) may take place after measure c) has been carried out if the evaluation of measure c) already reveals during the first cycle that trust value V is to be increased to V+. In contrast, a transition to measure d) may be implemented for traffic light system 10*a* selected during the first cycle if the evaluation of this traffic light system 10*a* according to measure c) reveals that trust value V is to be reduced to V− and no further traffic light system for which trust value V is to be increased is ascertainable in measure d).

What is claimed is:

1. A method for ascertaining which one of at least two traffic light systems located in an area in front of a motor vehicle has to be observed by the motor vehicle, the method comprising:

evaluating, using data from an optical sensor of the motor vehicle, the driving behavior of a vehicle traveling in front as a function of a current light status of each of the traffic light systems; and ascertaining which one of the traffic light systems located in the area in front of the motor vehicle has to be observed by the motor vehicle, based on the evaluation, wherein the ascertaining includes allocating a trust value to at least one of the traffic light systems as a function of the light status of the traffic light system and the driving behavior of the vehicle traveling in front, and selecting the traffic light system for which the trust value exceeds a predefined threshold, wherein the ascertaining of the traffic light systems to be observed is further based on a position of each traffic light system relative to lane boundaries of a traffic lane in which the motor vehicle is traveling, and relative positions of the traffic light systems with respect to one another.

2. The method as recited in claim 1, further comprising:

allocating the trust value to each of at least one of the traffic light systems as a function of the light status of the traffic light system and the driving behavior of the vehicle driving in front; and deriving from the at least one trust value which one of the traffic light systems is to be observed.

3. The method as recited in claim 1, further comprising:

allocating the trust value to each traffic light system of the traffic light systems, as a function of the light status of the traffic light system and the driving behavior of the vehicle driving in front; and deriving from the at least one trust value which one of the traffic light systems is to be observed.

4. A method for ascertaining which one of at least two traffic light systems located in an area in front of a motor vehicle has to be observed by the motor vehicle, the method comprising:

evaluating the driving behavior of a vehicle traveling in front as a function of a current light status of each of the traffic light systems;

ascertaining which one of the traffic light systems located in the area in front of the motor vehicle has to be observed by the motor vehicle, based on the evaluation; and a) selecting one of the at least two traffic light systems as a function of at least one predefined parameter, and specifying a trust value for the selected traffic light system;

b) monitoring the driving behavior of a vehicle traveling directly in front as a function of a display status of the selected traffic light system;

c) evaluating whether the trust value is to be increased or reduced as a function of the monitoring according to measure b), and when the evaluation shows that the trust value is to be reduced, then the measures a) through c) of the method are carried out anew in the selection of another traffic light system until a traffic light system is selected for which the evaluation according to the measure c) shows that the trust value is to be increased, or until the measures a) through c) are carried out for all traffic light systems without a traffic light system having been able to be identified for which the trust value is to be increased;

d) when a traffic light system for which the trust value is to be increased is able to be ascertained in measure c): comparing the increased trust value with a predefined threshold value and outputting the current display status of the traffic light system when the trust value is greater than the threshold value.

5. The method as recited in claim 4, wherein the measure b) is carried out only when a distance between the motor vehicle and the traffic light system does not exceed a predefined maximum value.

6. The method as recited in claim 4, wherein during a first cycle of the method after carrying out the measure c), a direct transition to the measure d) takes place when the evaluation of the measure c) shows during the first cycle that the trust value is to be increased.

7. The method as recited in claim 4, wherein a transition to the measure d) takes place for the traffic light system selected during the first cycle when the evaluation of the traffic light system according to the measure c) shows that the trust value is to be reduced and no further traffic light system for which the trust value is to be increased is ascertainable in the measure d).

8. The method as recited in claim 4, wherein:

it is evaluated in the measure c) that the trust value is to be increased when a red display status of the traffic light system was detected and a deceleration above a predefined threshold value of the vehicle traveling in front was detected; and it is evaluated in the measure c) that the trust value is to be increased when a green display status of the traffic light system was detected and no significant change in the speed of the vehicle traveling in front or a speed above a predefined threshold value of the vehicle traveling in front was detected.

9. The method as recited in claim 4, wherein it is evaluated in the measure c) that the trust value is to be reduced when a green display status of the traffic light system was detected and a deceleration above a predefined threshold value of the vehicle driving in front was detected; and it is evaluated in the measure c) that the trust value is to be reduced when a red display status of the traffic light system was detected and no significant change in the speed of the vehicle traveling in front or a speed above a predefined threshold value of the vehicle traveling in front was detected.

10. A control unit for a motor vehicle, the control unit being configured to ascertain which one of at least two traffic light systems located in an area in front of a motor vehicle has to be observed by the motor vehicle, the control unit configured to:

evaluate, using data from an optical sensor of the motor vehicle, the driving behavior of a vehicle traveling in front as a function of a current light status of each of the traffic light systems; and ascertain which one of the traffic light systems located in the area in front of the motor vehicle has to be observed by the motor vehicle, based on the evaluation, wherein the ascertaining includes allocating a trust value to at least one of the traffic light systems as a function of the light status of the traffic light system and the driving behavior of the vehicle traveling in front, and selecting the traffic light system for which the trust value exceeds a predefined threshold, wherein the ascertaining of the traffic light systems to be observed is further based on a position of each traffic light system relative to lane boundaries of a traffic lane in which the motor vehicle is traveling, and relative positions of the traffic light systems with respect to one another.

11. A motor vehicle, comprising:

an optical sensor configured to monitor an area in front of the motor vehicle; and a control unit connected in a data-transmitting manner to the optical sensor so that sensor data pertaining to the area in front are able to be transmitted to the control unit, the control unit being configured to ascertain which one of at least two traffic light systems located in an area in front of a motor vehicle has to be observed by the motor vehicle, the control unit configured to:

evaluate the driving behavior of a vehicle traveling in front as a function of a current light status of each of the traffic light systems; and ascertain which one of the traffic light systems located in the area in front of the motor vehicle has to be observed by the motor vehicle, based on the evaluation, wherein the ascertaining includes allocating a trust value to at least one of the traffic light systems as a function of the light status of the traffic light system and the driving behavior of the vehicle traveling in front, and selecting the traffic light system for which the trust value exceeds a predefined threshold, wherein the ascertaining of the traffic light systems to be observed is further based on a position of each traffic light system relative to lane boundaries of a traffic lane in which the motor vehicle is traveling, and relative positions of the traffic light systems with respect to one another.

* * * * *